INVENTOR.
EDWARD L. ALLEN
BY Charles J. Worth
AGENT

Jan. 17, 1967  E. L. ALLEN  3,298,586
TOOL FOR MAKING SOLDERED WIRE WRAPPED TERMINAL CONNECTIONS
Filed Oct. 5, 1964  2 Sheets-Sheet 2

INVENTOR.
EDWARD L. ALLEN
BY Charles J. Worth
AGENT

United States Patent Office 3,298,586
Patented Jan. 17, 1967

3,298,586
TOOL FOR MAKING SOLDERED WIRE WRAPPED TERMINAL CONNECTIONS
Edward L. Allen, Bradford, Pa., assignor to Ingersoll-Rand Company, New York, N.Y., a corporation of New Jersey
Filed Oct. 5, 1964, Ser. No. 401,587
15 Claims. (Cl. 228—2)

This invention relates generally to power driven hand tools and more particularly to such tools which provide heat.

The present invention is particularly adapted to a wire wrapper for making a wrapped and soldered terminal connection, and will be described herein in this environment, and in modified form as a soldering iron.

An object of the present invention is to provide a power tool for creating heat and for transmitting such created heat.

Another object of hte present invention is to provide a tool to facilitate making wire wrapped terminal connections.

Another object of the present invention is to provide the aforementioned tool which provides heat for soldering the connections.

Still another object of the present invention is to provide the aforementioned tool which has mechanical means for providing the heat for soldering.

And another object of the present invention is to provide the aforementioned tool which is ruggedly constructed and not prove to malfunction.

The present invention contemplates a tool comprising a housing, a friction and heat transmitting liner disposed in the housing, a member connected to the liner for transmitting heat of friction from the tool, motor means disposed in the housing having a rotor with a spindle extending toward the liner, and friction shoe means connected to the spindle for movement relative to the liner when the rotor is driven and being urged into frictional contact with the liner as the shoe means is moved to create heat by friction to be transmitted by the liner and the member connected thereto.

The foregoing and other objects and advantages will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of the invention.

Figures 1, 2:
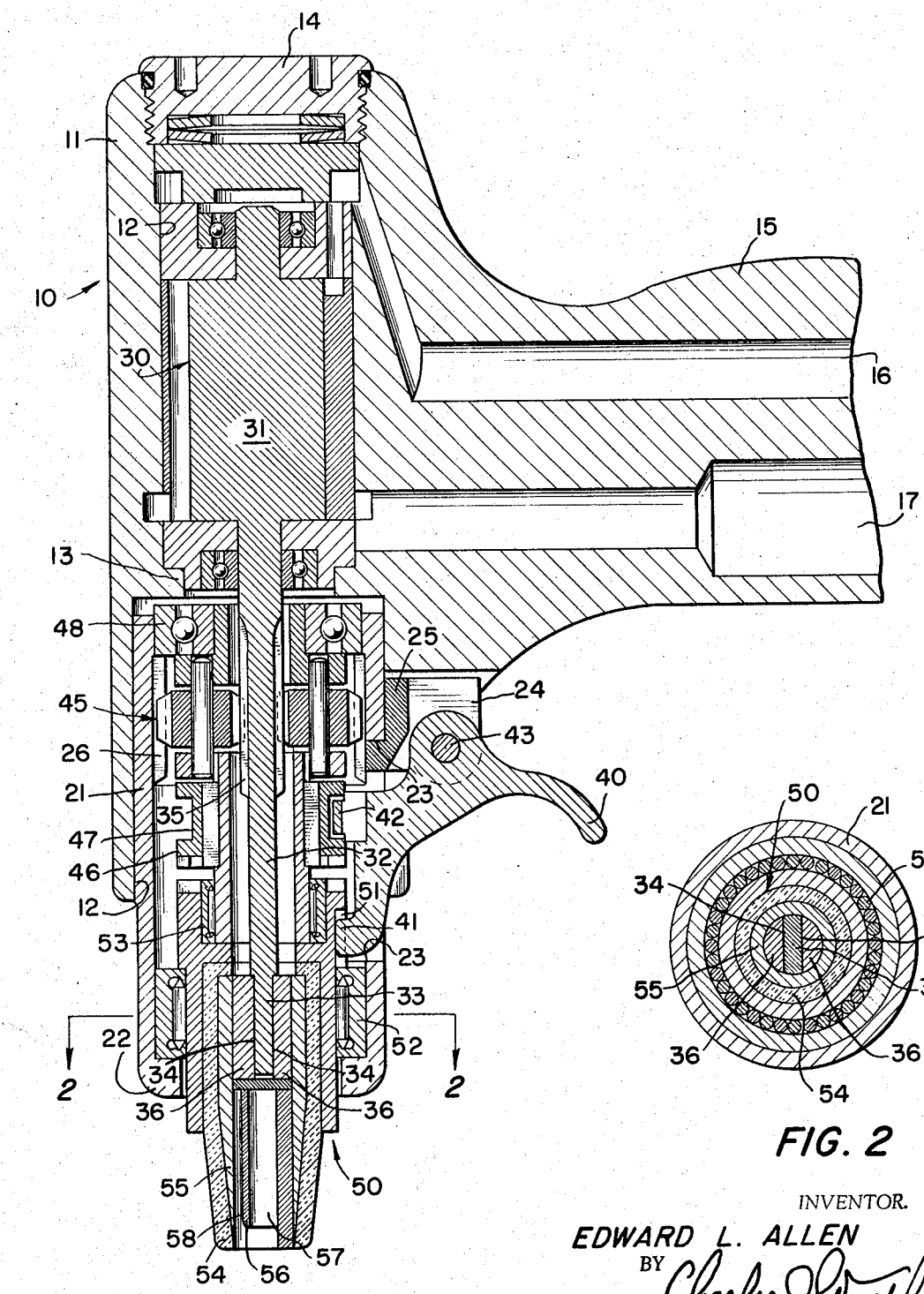
Figure 3:
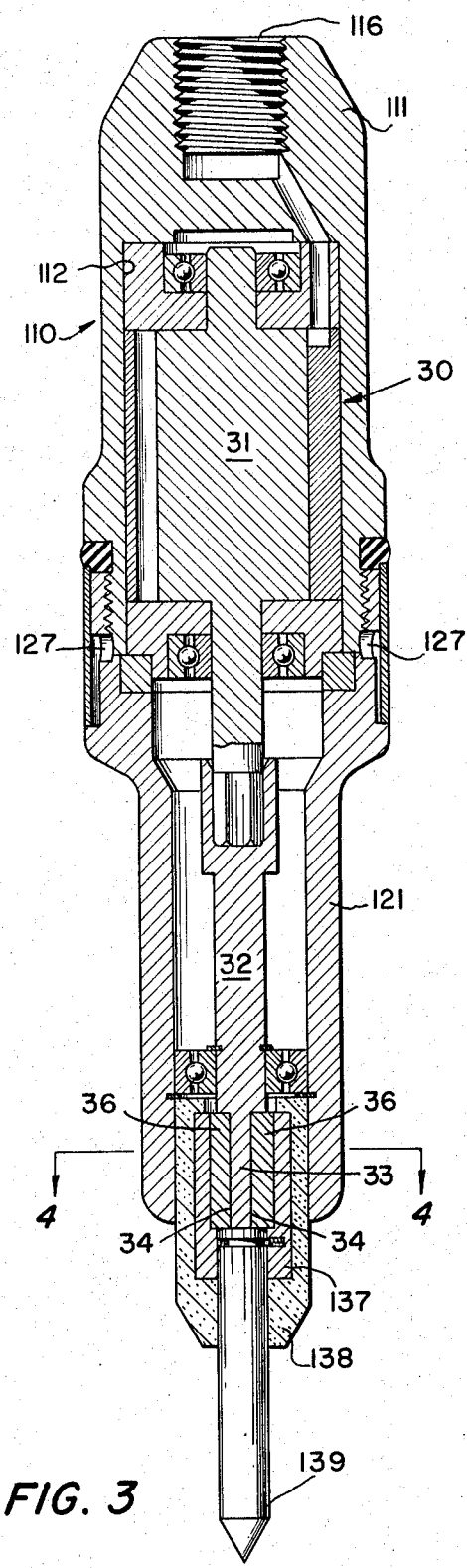
Figure 4:
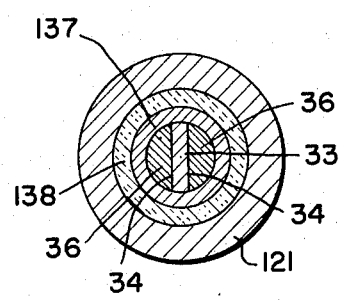

FIG. 1 is a sectional view of a wire wrapping tool made in accordance with the present invention, FIG. 2 is a sectional view taken on line 2—2 of FIG. 1, FIG. 3 is a sectional view, similar to FIG. 1, showing a modified tool made in accordance with the present invention, and FIG. 4 is a sectional view, similar to FIG. 2, taken on line 4—4 of FIG. 3.

Referring now to the drawings and particularly to FIGS. 1 and 2, a tool made in accordance with the present invention has a housing 10 formed by a backhead casing 11 and a tubular front gear and clutch casing 21. Casing 11 has an axial through bore 12 with an annular flange 13 therein spaced from the ends of the bore.

An air motor 30 is disposed in bore 12 rearwardly of flange 13 and is retained by a cap or cap assembly 14 which also closes the back end of bore 12. Casing 11 has a grip portion 15 with a passage 16 for receiving and delivering pressure fluid to motor 30 and a passage 17 for exhaust from the motor.

Casing 21, open at both ends is disposed in bore 12 forwardly of flange 13 and extends out of casing 11 terminating in an inwardly disposed annular flange 22 at its front end. Although any means well known in the art may be used to connect casing 21 to casing 11, a novel key arrangement is provided.

As shown, an axial trigger slot 23 is provided in the bottom of casing 21. A trigger 40, which extends into casing 21 through slot 23 is pivotally mounted on a pin or axle 43 which connects a key 24 to casing 11. Key 24 has a lug 25 which engages the back of slot 23 to prevent axial and rotational movement between casing 21 and casing 11. Trigger 40, biased forwardly (clockwise in FIG. 1) by any conventional means (not shown), has a pair of upwardly disposed spaced lugs 41 and 42.

A tubular driven clutch spindle 50 is rotatably mounted in a bearing 52 disposed in the front end of casing 21, and has an axial homing flange 51 which is engaged by lug 41 of trigger 40 to prevent spindle 50 from rotating. Spindle 50 is provided with a forwardly extending insulator 54 with a tubular insert or liner 55 of friction and heat transmitting material that is axially alined with motor 30. A wire wrapper bit 56, having an axial bore 57 and an axially disposed peripheral slot 58, is disposed in the forward end of liner 55 for rotation as a unit with spindle 50 and its insulator 54 and liner 55.

Motor 30 has a rotor 31, driven by pressure fluid from passage 16, with a forwardly extending spindle portion 31 which terminates at its front end in liner 55 adjacent bit 56. Spindle portion 32 has a spline 35, and a blade portion 33 at its forward end formed by a pair of diametrically opposed recesses 34. A pair of friction shoes 36 are provided in recesses 34.

A gear train 45, is this instance being of a planetary type, includes a frame supported at its back end by a bearing 48 in casing 21 and at front end by a bearing 53 in tubular spindle 50. Gear train 45 meshes with splines 35 of spindle portion 32 and splines 26 of casing 21 to rotate its frame and driving clutch member 46 connected thereto at a slower rate than the rate of rotation of rotor 31.

Clutch member 46, axially movable in casing 21 relative to gear train 45 to engage with or disengage from clutch spindle 50 depending upon its axial position, has an annular groove 47 providing a track for lug 42 of trigger 40.

In operation, pressure fluid received by inlet passage 16 enters motor 30 and drives rotor 31 and its spindle 32; the driving fluid exhausting through passage 17. Flow of pressure fluid is controlled by valve means or the like (not shown) which may be provided in the grip portion 15 of casing 11 or in a fluid supply line connected thereto.

Rotor 31 through spindle 32 moves shoes 36 relative to liner 55 which they frictionally engage to create heat by friction. Rotor 31 through its spindle 32 and the gear train 45 rotates driving clutch member 46 at a rotation rate lower than the rotation rate of the spindle 32.

With the biased trigger released, lug 41 engages flange 51 to prevent rotation of clutch spindle 50 while the cam lug 42 in groove 47 simultaneously urges the drive clutch member 46 axially rearwardly out of engagement with the blocked clutch spindle 50.

The end of a wire (not shown) to be wrapped is inserted in slot 58 of bit 56 then a terminal (not shown) to be wrapped is inserted in bore 57. The heat of friction is transmitted to the wire and terminal by liner 55 alone or together with bit 56.

For wrapping, trigger 40 is depressed or moved (counterclockwise in FIG. 1) against its bias moving stop lug 41 out of engagement with flange 51 freeing clutch spindle 50 for rotation. Cam lug 42 in track 47 simultaneously moves driving cam member forwardly into driving engagement with cam spindle 50. Frictional heat is also created during wrapping since liner 55 is rotating at the slower rate of rotation of cam member 46 while shoes 36 are being moved at the more rapid rate of rotation of rotor 31.

When wrapping is completed trigger 40 is released and is moved to its original position moving cam member 46 out of engagement with cam spindle 50 which is blocked in a predetermined home position from further rotation. The novel tool is then removed from the heated wrapped terminal (not shown) and solder (not shown) is then applied thereto.

For high speed wrapping, the novel tool may be modified (not shown) by eliminating gear train 45 and mounting cam member 46 on spindle 32. With this arrangement, cam member 46 moves axially on spindle 32 and rotates at the same rate. Thus, cam spindle 50 will be driven at the faster rate and at the same as shoes 36. Liner 55 and shoes 36 now rotate at the same rate and no friction heat will be created during wrapping.

Although not shown, an electric motor may be provided in place of motor 30. With such an arrangement, electrical leads would replace passages 16 and 17.

The novel wire wrapping tool shown in FIG. 1 may have a modified housing similar to housing 110 of FIG. 4 which is further modified to illustrate a tool which has no wrapping function and merely provides heat for soldering.

Housing 110, corresponding to housing 10 of FIG. 1, has a tubular backhead casing 111 that is threadedly connected to a tubular front casing 121. Backhead 111 has an axial bore 112 for housing motor 30 and terminating at its back end as an inlet port 116 for receiving and transmitting pressure fluid to the motor. A plurality of angularly spaced ports 127 is provided in the back end of casing 121 adjacent its threaded connection with casing 111 to provide a fluid discharge for motor 30.

An insulator 138 is fixedly connected in the front end of casing 121 and extends outwardly therefrom. Insulator 138 is provided with a tubular liner 137 of friction material, and a soldering tip 139 that extends forwardly out of the insulator.

Motor 30 has a rotor 31 with a forwardly extending spindle 32 which extends into the liner 137 and terminates adjacent the back end of soldering tip 139. The front end of spindle 32 within liner 137 has a blade portion 33 formed by a pair of diametrically opposed recesses 34 which house a pair of friction shoes 36.

Flow of pressure fluid is controlled by a valve (not shown) and drives rotor 31 of motor 30. Rotation of rotor 31 and its spindle 32 moves shoes 36 relative to liner 137, the friction therebetween creating heat which is transmitted by liner 137 to tip 139 which, in turn, transmits such heat from friction to the point to which it is to be applied.

Thus, in accordance with the present invention, an efficient tool is provided for creating heat by friction for soldering as a singular friction, and/or which can be combined with means for wrapping wires on terminals wherein the heat by friction is applied to the terminal and wire for soldering during the wrapping operation.

Although several embodiments of the invention have been illustrated and described in detail, it is to be expressly understood that the invention is not limited thereto. Various changes may be made in the design and arrangement of the parts without departing from the spirit and scope of the invention as the same will now be understood by those skilled in the art.

I claim:
1. A power tool comprising:
 (a) a casing and a motor disposed in the casing;
 (b) means fixedly disposed in the casing and extending therethrough for transmitting heat for soldering;
 (c) means movably disposed in the casing and operatively associated with the fixed means to provide heat for soldering by relative movement between the two means; and
 (d) the movable means being connected to the motor and moved thereby relative to the fixed means.

2. A power tool comprising:
 (a) a casing and a motor disposed in the casing;
 (b) means extending through the casing for transmitting heat for soldering and being adapted to wrap a wire on a terminal to be soldered that is heated by the transmitted heat;
 (c) means rotatably disposed in the casing and operatively associated with the transmission means to provide heat for soldering by relative rotation between the two means;
 (d) the rotatable means being connected to the motor and rotated thereby; and
 (e) means for releasably holding the transmitting means against rotation to provide heat for soldering, and for connecting the transmitting means when released to the motor for rotation thereby to wrap a wire on a terminal.

3. A power tool comprising:
 (a) a casing and a motor disposed in the casing;
 (b) means extending through the casing for transmitting heat for soldering and being adapted to wrap a wire on a terminal to be soldered that is heated by the transmitted heat;
 (c) means rotatably disposed in the casing and operatively associated with the transmission means to provide heat for soldering by relative rotation between the two means;
 (d) the rotatable means being connected to the motor and rotated thereby; and
 (e) means for releasably holding the transmitting means against rotation to provide heat for soldering, and for connecting the transmitting means when released to the motor for rotation thereby at a speed different from the speed of rotation of the rotating means to wrap a wire on a terminal and simultaneously to provide heat for soldering.

4. A power tool comprising:
 (a) a casing and a motor disposed in the casing;
 (b) means held against rotation in the casing and extending therethrough for transmitting heat for soldering;
 (c) a spindle disposed in the casing and connected to the motor for rotation thereby; and
 (d) means connected to the end of the spindle for movement thereby, and frictionally engaging the transmitting means to provide heat for soldering by friction when the spindle rotates relative to the transmitting means.

5. The power tool in accordance with claim 4, the heat transmitting means comprising:
 (a) a sleeve member supported in the casing; and
 (b) a member fixedly disposed in the sleeve member and extending through the casing.

6. The power tool in accordance with claim 5, and:
 (a) a heat shield encircling the sleeve member along its length.

7. The power tool in accordance with claim 5, and:
 (a) the friction means connected to the spindle being disposed in and frictionally engaging the sleeve member.

8. A power tool comprising:
 (a) a casing and a motor disposed in the casing;
 (b) means held against rotation in the casing and extending therethrough for transmitting heat for soldering;
 (c) a spindle shaft disposed in the casing and connected to the motor for rotation thereby;
 (d) means connected to the end of the spindle shaft for movement thereby, and frictionally engaging the transmitting means to provide heat for soldering by friction when the spindle shaft rotates relative to the transmitting means; and (e) control means operatively associated with the transmitting means releasably holding the transmitting means against rotation.

9. A power tool comprising:
(a) a casing and a motor disposed in the casing;
(b) means extending through the casing for transmitting heat for soldering and being adapted to wrap a wire on a terminal to be soldered that is heated by the transmitted heat;
(c) a spindle shaft disposed in the casing and connected to the motor for rotation thereby;
(d) means connected to the end of the spindle shaft for movement thereby, and frictionally engaging the transmitting means to provide heat for soldering by friction when the spindle shaft rotates relative to the transmitting means; and
(e) control means operatively associated with the transmitting means releasably holding the transmitting means against rotation, and connecting the transmitting means when released to the motor to be rotated simultaneously with the spindle shaft.

10. The power tool in accordance with claim 9, the heat transmitting means comprising:
(a) a tubular spindle rotatably disposed in the casing;
(b) a sleeve member fixedly supported in the tubular spindle; and
(c) a member fixedly disposed in the sleeve member and extending through the casing.

11. The power tool in accordance with claim 10, and:
(a) a heat shield encircling the sleeve member along its length.

12. The power tool in accordance with claim 10, and:
(a) the friction means connected to the spindle shaft being disposed in and frictionally engaging the sleeve member.

13. The power tool in accordance with claim 10, wherein:
(a) the member fixedly supported in the sleeve member is a bit adapted to receive a wire and a terminal, and to wrap the wire on the terminal when the transmitting means is rotated to form a connection to be soldered when heated by the transmitted heat.

14. The power tool in accordance with claim 13, the control means comprising:
(a) a control member having a lug and being connected to the casing for movement between a first operating position in which the lug engages the tubular spindle and prevents rotation of the transmitting means, and a second position in which the lug is disengaged from the tubular spindle; and
(b) means operatively associated with the control member connecting the transmitting means to the motor for rotation thereby when the lug is disengaged.

15. The power tool in accordance with claim 13, the control means comprising:
(a) a control member having a lug and being connected to the casing for movement between a first operating position in which the lug engages the tubular spindle and prevents rotation of the transmitting means, and a second position in which the lug is disengaged from the tubular spindle; and
(b) planetary gears rotatably supported on a frame and in mesh with the casing and the spindle shaft so the frame is rotated by the motor rotating the spindle shaft; and
(c) a clutch connected to the gear frame for rotation therewith and being operatively associated with the control member for movement into engagement with the tubular spindle thereby when the lug is disengaged to connect the transmitting means to the motor for rotation thereby.

References Cited by the Examiner
UNITED STATES PATENTS

| | | | |
|---|---|---|---|
| 2,585,010 | 2/1952 | Hickman et al. | 242—7 |
| 2,635,819 | 4/1953 | Bennett | 242—7 |
| 2,688,449 | 9/1964 | Haagensen | 242—7 |
| 3,200,922 | 8/1965 | Allen | 242—7 X |
| 3,243,130 | 3/1966 | Rebechini | 242—7 |

WILLIAM J. STEPHENSON, *Primary Examiner.*